INFUSION MACHINE

Original Filed Dec. 13, 1961 3 Sheets-Sheet 1

INVENTOR.
ANDRES M. CARRILLO
BY Smith and Smith
ATTORNEYS.

INFUSION MACHINE

Original Filed Dec. 13, 1961 3 Sheets-Sheet 2

INVENTOR.
ANDRES M. CARRILLO
BY Smith & Smiley
ATTORNEYS.

INFUSION MACHINE

Original Filed Dec. 13, 1961 3 Sheets-Sheet 3

INVENTOR.
ANDRES M. CARRILLO
BY Smith & Smith
ATTORNEYS.

United States Patent Office

Re. 26,463
Reissued Sept. 24, 1968

26,463
INFUSION MACHINE

Andres M. Carrillo, Miami, Fla., assignor to Rotat-Coffee, Inc., a corporation of Puerto Rico Original No. 3,128,691, dated Apr. 14, 1964, Ser. No. 160,408, Dec. 13, 1961. Application for reissue Apr. 14, 1966, Ser. No. 554,918
9 Claims. (Cl. 99—293)

Matter enclosed in heavy brackets [ ] appears in the original patent but forms no part of this reissue specification; matter printed in italics indicates the additions made by reissue.

*ABSTRACT OF THE DISCLOSURE*

*A machine particularly useful for brewing coffee which includes a brew tank, a centrifugal strainer in the brew tank and a centrifugal pump in open communication with the strainer for pumping liquid from the lower portion of the brew tank through the strainer and connected for rotation with the pump.*

This invention relates to a machine for making infusions. More particularly, this invention relates to a method and a machine to brew coffee.

The term "powder" is use herein for purposes of simplification to denote any pulverized or milled substance or matter, particularly coffee, whose soluble and aromatic elements are extracted by the "machine"; "machine" to denote any mechanical or electrical apparatus, particularly coffee-makers in general, used to extract the soluble and aromatic elements of any pulverized or milled substance or matter; "batch" to denote any independent and complete operation of extracting, until its final commercial yield, the soluble and aromatic elements of a certain, precise amount of power placed in the machine; and "drink" to denote the liquid of infusion obtained on each batch and ready for serving.

It is an object of this invention to provide an improved machine that, when operating, works under a physical principle other than those used by the machines of prior art.

Another object of the invention is to provide an improved machine suitable to brew any kind of powder.

Another object of the invention is to provide an improved machine suitable to obtain from the powder a commercial yield larger than those obtained by known machines.

Another object of the invention is to provide a non-risk, more easy handling machine.

Another object of the invention is to provide an improved machine that gives more uniformity to the quality of the drink, reducing the time of the batch.

Another object of the invention is to provide an improved machine that avoids the insertion in the powder and drink of specks and other particles from the atmosphere and keeps the aroma of the drink for a longer period.

Another object of the invention is to provide an improved machine capable of being easily constructed at a low cost.

Another object of the invention is to provide an improved machine that keeps the drink hot in storage, at same deposit in which it was obtained.

Other objects of the invention will become apparent upon consideration of the specification and the claims which follow.

Several types of machines for the above purposes are well-known in the art, differing from each other because of the various mechanical means or elements forming part of them. These machines make the batch essentially under three physical principles. These principles are: (1) gravity force; (2) pressure over the normal or atmospheric pressure; and (3) vacuumn or pressure under the normal or atmospheric pressure.

Gravity force is generally used, in those types of machines with which a mild drink is obtained, these machines being useful at the same time, as containers for the drink. These types of machines are widely used in the United States of America to make American coffee.

The machines working under pressure over the atmospheric pressure comprise two types: (1) the type that works by means of steam from a boiler forming part of the body of the machine, the boiler supplying both hot water and pressured steam; and (2) the type that works under compressed air induced by a suitably disposed compressor.

In the group of machines that function under pressure above atmospheric is also included the type functioning under mechanical pressure, in which water is forced through the powder by a piston strained to the reaction of a spring previously actuated by a manual lever.

The vacuum or pressure under the normal atmospheric pressure is used by those machines in which a low pressure is created in a cavity beneath the strainer, so as to induce water to flow through the powder contained in said strainer because of the difference of pressure established between normal or atmospheric pressure and the pressure existing in said cavity.

The machines that function under pressure over the normal or atmospheric pressure are those used to make rapid batches and the so-called "espresso coffee."

All of these machines are subject to many inconveniences such as delay and/or insufficiency of the batches, particularly when the machines function under gravity force; danger in handling the machines functioning under steam pressure and compressed air; complicated handling and construction; low commercial yield, and higher operative and construction costs.

One of the greatest inconveniences of these machines, particularly those functioning under high pressure from steam boilers, is the high temperature water required, always exceeding 100° C., to make the batch.

This high temperature alters the drink, particularly when making coffee, because certain substances of toxicity are extracted from the powder or because it converts into toxics certain substances that were wholesome at a lower temperature, according to tests made by Brazilian skilled experts in the art.

It is an important object of this invention to provide a method and a machine that obviate the above described defects and limitations of the machines of prior art.

The efficiency of this invention relies on the rotatory and continuous movement that, by means of a suitable combination of centrifugal force and pumping effect, is given to water when flowing through the powder. Because of repeating this rotatory movement many times on each batch, water will always circulate, commencing as from the second turn, with some extract of the powder obtained in the preceding turn, thus resulting that at the end of each batch the powder will give its high commercial yield.

In a preferred embodiment of this invention, the machine comprises, in combination, a cylindrical metal body in the form of a receptacle internally divided in two independent coaxial tanks with one bottom, one of which, as for example the external tank, containing sufficient water to provide not only the water required for the batch but also to act as a storage heater of the drink; and the other, the internal tank, having the precise water required for the batch, this water coming from the external tank through a faucet, and which internal tank is used also as a deposit or container for the drink; an independent antiturbulence element separably disposed within said internal tank providing two chambers of circulation and re-circulation; a pumping body, also functioning as a centrifugal strainer-holder, which comprises a head and an inverted conical trunk bored along its axis and provided with longitudinal ducts inclined downwardly extended around the central bore, which conical trunk is separably disposed within the central chamber while the head is placed on top portion of said internal tank; a strainer disposed upon the head of said holder; a rotatory vertical axle that centrally penetrates through the bottom of said metallic body and connecting with said strainer holder; means to cause rotation of said axle; means for heating water in said external tank; means for discharging the drink from said internal tank, and external water level means for both, the drink deposited in said internal tank and water contained in said external tank.

The invention will be more readily understood by reference to the drawings wherein similar elements in the several figures are designated by the same reference characters.

Figure 3:
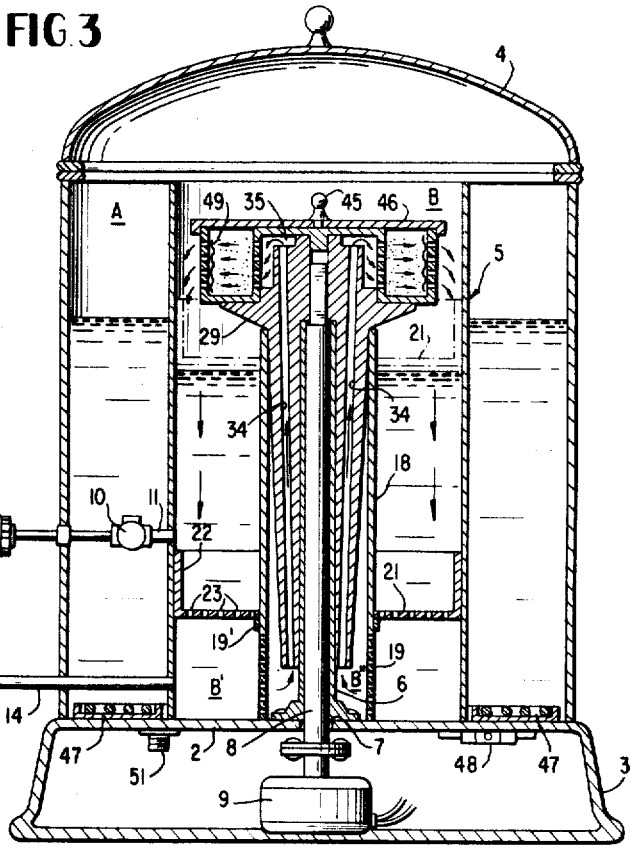
FIGURE 3 is a vertical sectional view of the machine taken on line 3—3 in FIGURE 1.
Figure 14:
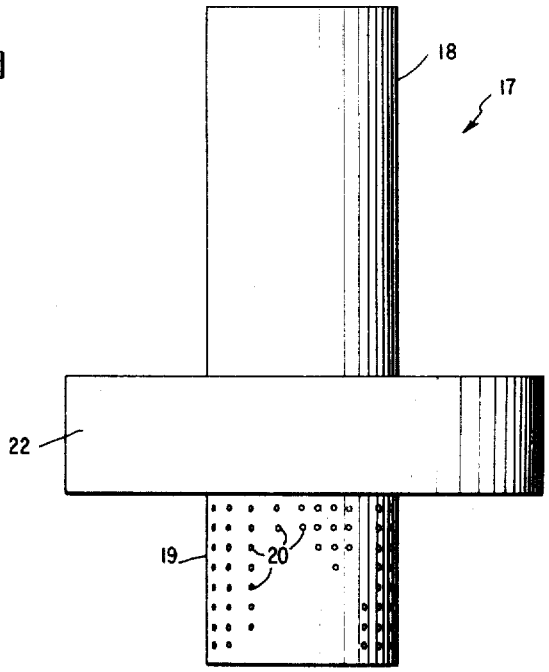
FIGURES 14 and 15 are lateral and top views, respectively, of the independent antiturbulence element disposed within the internal tank of the body of the machine providing two chambers in said internal tank.
Figure 15:
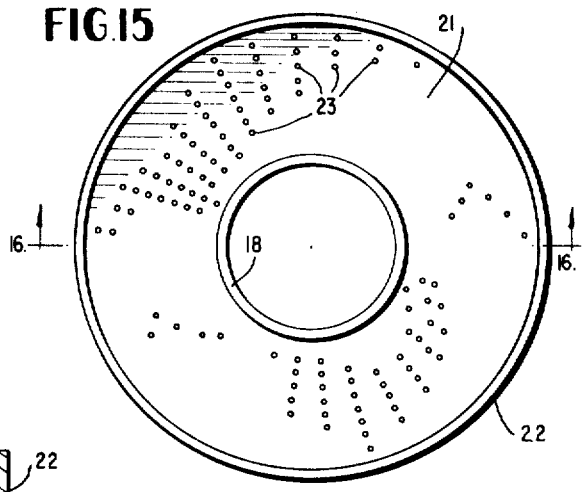

As shown in the drawings, the machine of this invention comprises an external body or metallic receptacle 1 having a bottom 2, a hollow base 3 and a cover 4. The inside of said body 1 is divided in two coaxial tanks A and B by means of a cylindrical sheet-metal wall 5 fixed to the bottom 2, as shown in FIGURE 3. A tubular duct 6 is fixedly mounted on bottom 2 of body 1 surrounding a central opening 7 through which a rotatory axle 8 passes, suitably connected to an electric motor 9 placed in hollow base 3. The axle presents, at least in its upper portion 33, a square cross-section of smaller dimensions than the lower portion. A faucet 10 is disposed in tank A and connected to tank B through conduit 11, this faucet being externally controlled by means of handle 12 so as to permit flow of hot water from tank A to tank B when making the batch. The drink in tank B is discharged by means of the external faucet 13 and conduit 14 connected to said tank B, this conduit being outwardly extended through tank A. The external water level gauges 15 and 16 connected to the tanks A and B, respectively, are disposed to indicate, at any desired moment, the liquid contained therein. The internal tank B is also divided in two chambers B′ and B″ by means of an independent moveable piece shown in FIGURES 14, 15 and 16, and in sectional view of FIGURE 3. Said piece, designated 17, comprises a tubular member 18 of less height than wall 5, having its lower end portion 19 a series of bores 20 throughout its surface. Above said bored lower portion 19, the tubular member 18 is embraced by a disc 21 outwardly extended and presenting its peripheral zone upwardly bent at right angles forming a ring flange 22 which fits against the cylindrical wall 5 when piece 17 is placed in working position within tank B, as shown in FIGURE 3. The disc 21 is perforated by a series of bores 23. These bores 23 of disc 21 and bores 20 of the lower portion 19 of the tubular member 18, are means provided for circulation of liquid from chamber B′ to chamber B″, and at the same time, as filtrating elements. The tubular member 18 of piece 17, the inside of which forms said chamber B, has the specific funtcion of avoiding turbulence of liquid within said chamber B when element 24 rotates, thus enabling the non-turbulent liquid within this chamber B to flow up through ducts 34 by means of the pumping effect of said element 24.

Figure 16:
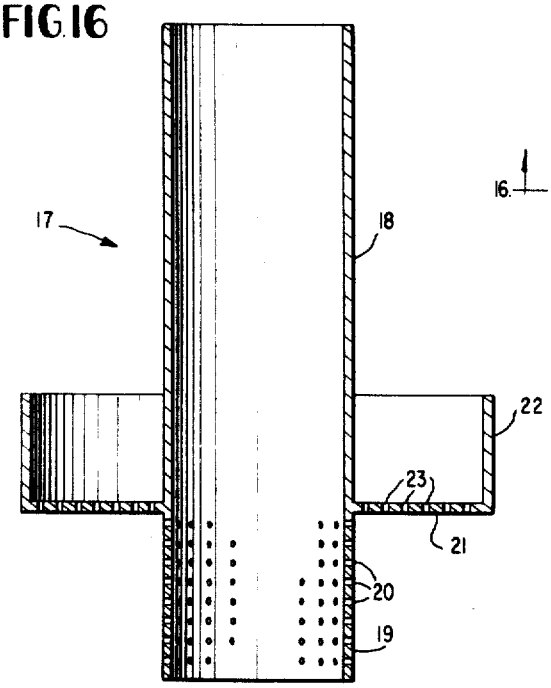
FIGURE 16 is a vertical sectional view of said independent antiturbulence element, taken on line 16—16 in FIGURE 15.
Figure 17:
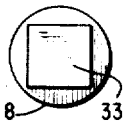
FIGURE 17 is a top view of the axle that causes the pumping and strainer holder element to rotate.

Disc 21 with its ring flange 22 may be fiixed to the tubular member 18 as shown in FIGURE 16, or it may remain independently so that it may be moved upwardly to the position shown in broken line in FIGURE 3 in order to use same as a filtering device of the powder in case of emergency when the centrifugal element is out of order, it being then necessary to make a batch under gravity force. If the disc 21 is movable on the tube 18, the latter preferably is provided with a stop 19′ to limit the lower position of the disc.

Figure 1:
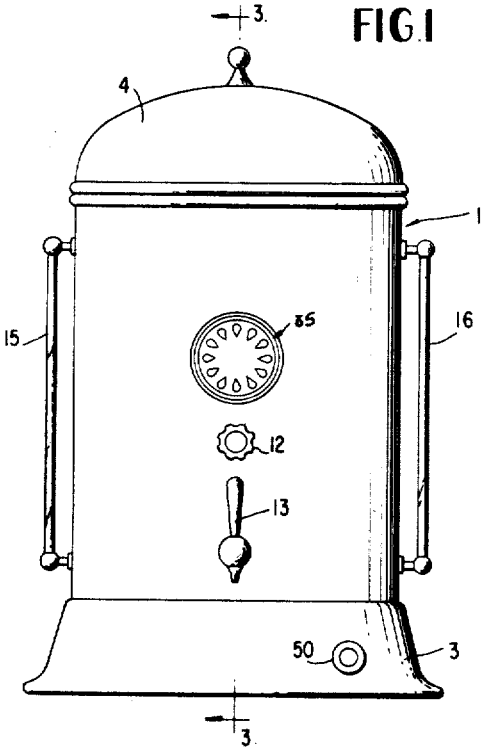
FIGURES 1 and 2 are side and top views, respectively, of the machine of this invention.
Figure 2:
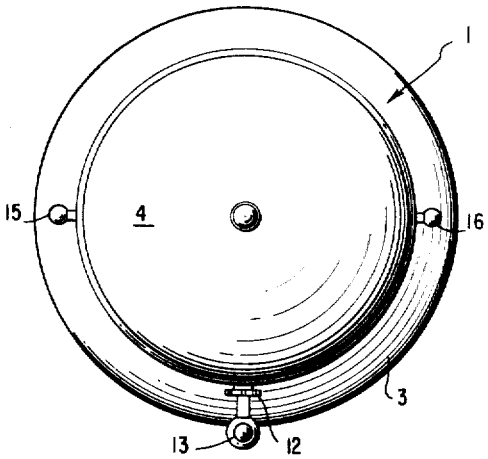
Figure 4:
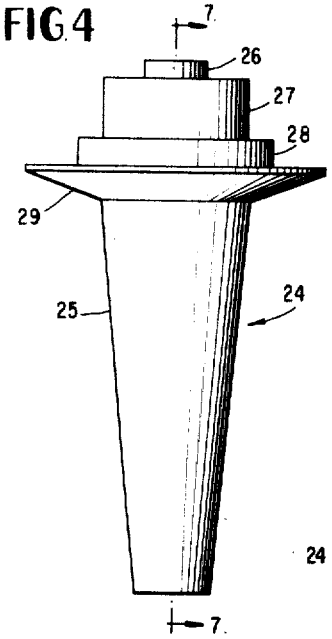
FIGURES 4, 5 and 6 are side, top and bottom views, respectively, of the pumping and colander-holder element of the machine.
Figure 5:
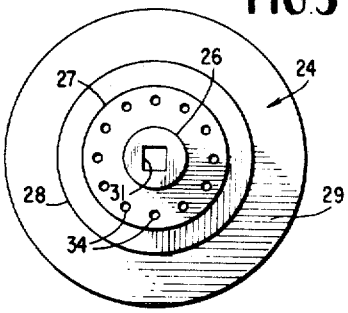
Figure 7:
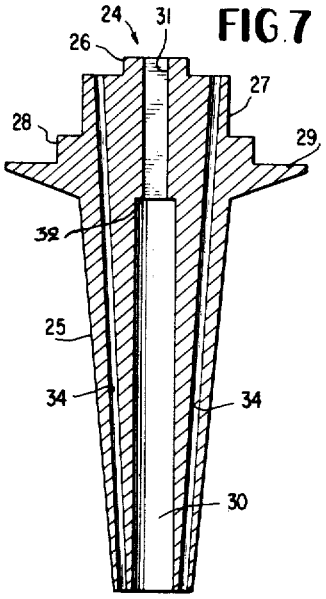
FIGURE 7 is a vertical sectional view of said pumping and holder element, taken on line 7—7 in FIGURE 4.
Figure 6:
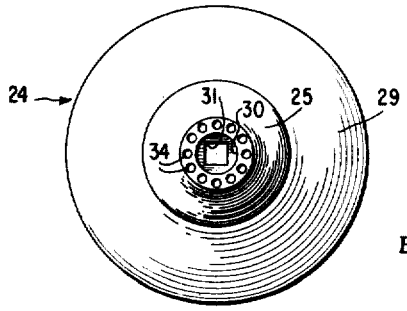

The pumping and strainer-holder element shown in FIGURES 4, 5, 6, 7 and 13 comprises a solid metallic member formed as an inverted truncated cone shaped body 25 and a head having four circular-shaped portions of different diameters, to wit; a portion of small diameter 26 projecting upwardly; a larger diameter portion 27 beneath the above; a third portion 28 of a diameter larger than that of portion 27 and located beneath the latter; and a further portion 29 beneath and of larger diameter than portion 28. Said pumping and strainer-holder element 24 is axially bored along its height, as shown in FIGURE 7, the bore, designated with number 30, presenting its upper portion 31 of square cross-section and providing a stop-shoulder 32 between portions 30 and 31.

A series of small diameter bores 34 are provided along the strainer-holder 24 extended from the lower end of body 25 to the upper surface of portion 27 of the head, these small bores 34 forming ducts for circulation of the liquid as explained hereafter. The height of conical-trunk body 25 of the strainer-holder 24 is less than the height of tubular member 18; the diameter of bore 30 of said strainer-holder is substantially identical to, or a bit larger than, the external diameter of central tube 6 of the tank B of body 1, and bore 31 of square cross-section is substantially identical to, or a bit larger than upper portion 33 of the rotating axle 8. Thus, when element 24 is placed in working position, as shown in FIGURE 3, the central tube 6 penetrates through bore 30 of the strainer-holder until it touches the shoulder 32; and the upper portion 33 of axle 8 projecting from tube 6 enters in bore 31 of the strainer-holder. It is important to remark a double function is performed by element 24 in holding strainer 36 on its head during the rotatory movement, so as to develop the centrifugal force required to impel water through the powder and also to act as a pump to raise liquid through ducts 34. The small diameter upper portion 26 of its head and the immediate lower portion 27 of a bit larger diameter provide a space 35 between them and the internal wall of strainer 36 in which water is discharged. Water flows up through ducts 34 into space 35, enters the strainer through openings 38 and, passing through the powder and openings 41, falls into chamber B′ of tank B, as shown by arrows in FIGURE 3.

The inclined position of said ducts 34 to effect raising of liquid through them when element 24 is pumping has been found to be important because the inclination causes the water to rise or pump by centrifugal action.

Figure 8:
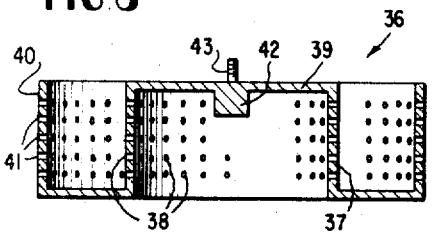
FIGURE 8 is a vertical sectional view of the strainer of the machine taken on line 8—8 in FIGURE 9.
Figure 9:
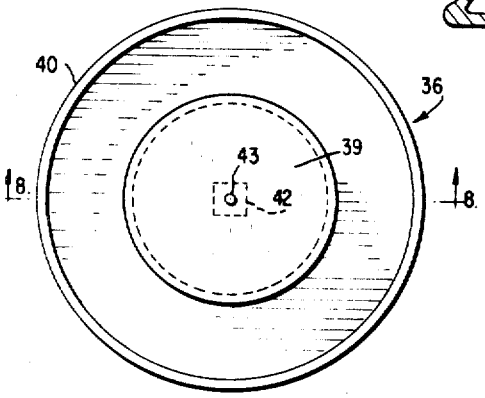
FIGURE 9 is a top view of the strainer.
Figure 11:
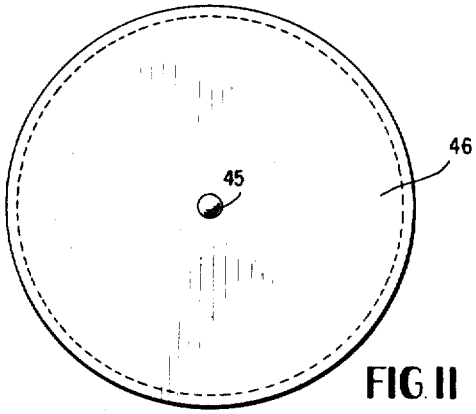
FIGURES 11 and 12 are top and lateral views, respectively, of the removable cover of the strainer.
Figure 10:
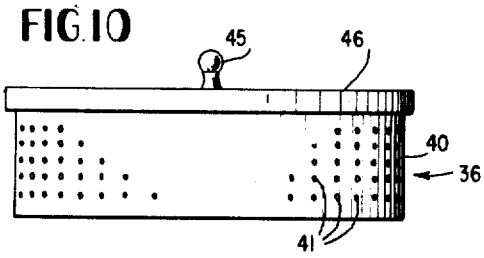
FIGURE 10 is a lateral view of the strainer with its removable cover.
Figure 12:
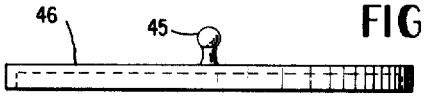
Figure 13:
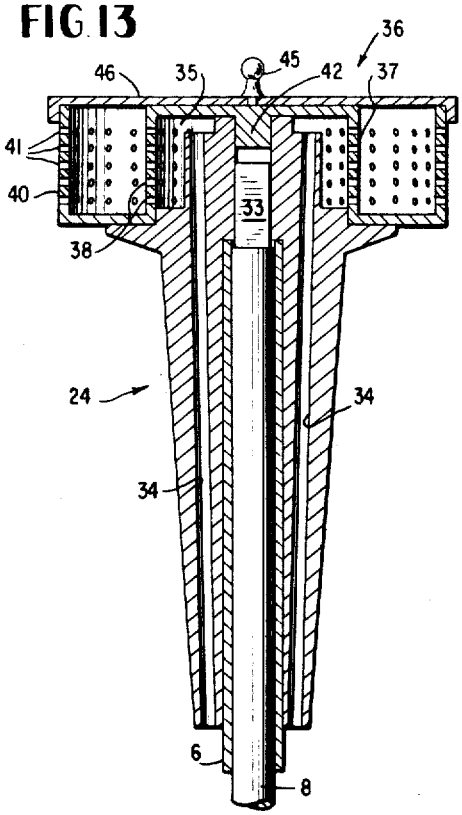
FIGURE 13 is a vertical sectional view showing pumping and strainer holder element with the strainer mounted thereof and connected to the actuating rotary axle.

The strainer 36 shown in FIGURES 8, 9 and 10, and also shown in FIGURES 3 and 13 comprises a flat bottom, channel shaped receptacle whose annular internal wall 37 is provided with perforations 38, and whose upper edge serves as a set for a fixed plate 39 that covers the central space embraced by said internal wall 37. The annular external wall 40 is also provided with perforations or openings 41. From the center of the upper plate 39 a small square-shaped tenon or journal 42 projects downwardly to penetrate in bore 31 of the strainer-holder 24, as shown in FIGURES 3 and 13. A screw 43 projects upwardly from the center of plate 39, on which an internally threaded knob 45 screws so as to fix cover 46 of the strainer.

On the bottom of tank A of the body of the machine a suitable isolated resistor 47 is disposed as a heater element of the water contained in said tank A, this resistor being connected to a suitably adapted thermostat 48 so as to keep the water always at a temperature ranging from 95 to 98° C. This heater element operates in a conventional way.

The operation of the described machine according to the invention is as follows. With water in tank A of the machine, the moveable element 17 should be placed in tank B with its tubular member 18 surrounding tube 6, its lower end portion 19 seating on bottom 2 and the ring flange 22 touching wall 5. The strainer-holder 24 and its conical-trunk body 25 are conveniently introduced through tubular element 18 so as to have the tube 6 and upper portion 33 of shaft 8 penetrating in axial bore portion 30 at the same time.

The lowermost position the strainer-holder 24 can reach, is determined by the seating of the shoulder 32 on the upper edge of tube 6, as shown in FIGURES 3 and 13, in which position portion 33 of square cross-section of axle 8 is placed in bore 31 having the identical section.

If it is deemed convenient, a paper filter, metal screen or any other filtering material 49 is placed inside the strainer 36 against its wall 40; then the strainer is filled with the powder required for a batch and finally covered with cover 46. The strainer 36 is mounted on the strainer-holder 24 in such a manner that its bottom rests on the portion 29 of the head of said strainer-holder, the lower portion of its internal wall 37 embraces portion 28 of said head, and the lower tenon 42 of plate 39 enters the bore 31 of square cross-section. With this position, the shaft 8 will drive the strainer-holder 24 and the strainer 36. By actuating handle 12 of faucet 10, the precise hot water required for the batch flows from tank A to tank B; then, cover 4 is placed to body 1. The electrical motor 9 is caused to operate by push-button switch 50 actuating a relay that closes the circuit of said motor and which circuit includes a conventional time clock 35 settable to operate the brewing machine automatically only during the estimated time of the batch.

While the motor 9 operates, the axle 8 rotates together with element 24 and strainer 36. The pumping effect of said element 24 causes water to flow up in chamber B″ to strainer 36 through ducts 34, space 35 and opening 38, and back to chamber B″ after passing through openings 41 of the strainer, openings 23 of disc 21 and openings 20 of tubular member 18. This flow is continuously repeated during each batch. The drink is ready for serving when the motor stops.

Hot water in external tank A keeps warm the drink in tank B. As shown in FIGURE 3, water is fed to the external tank A through duct 51.

The precise instant when it is necessary to make a new batch may be foretold by the water level 16 of internal tank B, and water level 15 indicates the amount of water in the external tank A.

It is evident that the foregoing description, being merely illustrative, does not limit this invention, and that it is possible to alter the embodiment of this description within the scope of the following claims.

I claim:

1. A machine for making infusions, particularly for brewing coffee, comprising a heating and storage tank for water, a brew tank for brewing and storing a batch of the infusion located completely within the storage tank, manual means for controlling flow of heated water from said storage tank to said brew tank, a centrifugal strainer for holding grounds to be infused located in the upper part of said brew tank, a centrifugal pump in said brew tank for causing the liquid to be contained therein to flow into said centrifugal strainer, heating means in said water storage tank, means for conducting and serving the infusion from said brew tank to a point outside the water storage tank, and means for rotating said pump and said strainer.

2. A machine according to claim 1, wherein both said storage and brew tanks are provided with external liquid level gauges.

3. A machine according to claim 1, wherein said water storage and brew tanks are coaxial and have a common bottom, said bottom being provided with a central opening surrounded by a tubular duct upwardly extended within said brew tank, said duct rotatably supporting said pump and strainer.

4. A machine according to claim 3, wherein said means for rotating said pump and said centrifugal strainer comprises an electric motor and a shaft connected to said motor and to said pump and passing through said tubular duct.

5. A machine according to claim 4, wherein the pump is a solid piece of inverted conical shape bored along its axis, said solid piece having longitudinal bores of smaller cross-section than the axial bore and which are downwardly and inwardly inclined around said axial bore.

6. A machine according to claim 5 wherein said piece comprises a head disposed to fit said strainer and an enlarged lower body, said axial bore having a square cross-sectional upper portion and a circular cross-sectional lower portion, the said upper portion being of smaller dimension than the lower portion, and a shoulder between both of said portions seating the pump on a corresponding shoulder of said motor shaft, said shaft having a square cross-sectional upper portion which is inserted into the upper portion of the axial bore of said pump.

7. For use in a machine for making infusions, particularly to brew coffee, the combination with a centrifugal strainer having a bored, annular channel-shaped receptacle whose central space is covered by a plate fixed to the edge of the internal wall of said annular receptacle, and a square-shaped tenon projecting downwardly from the center of said plate, of an inverted, conical, centrifugal pump comprising a solid piece bored axially, a plurality of downwardly and inwardly inclined bores around said axial bore, a head on said piece having four portions of different and increasing diameters in a downward direction, the height of said centrifugal strainer being such that, when placed in operating position seated upon the largest diameter portion of said head, its central plate remains over the smallest diameter portion thereof, thereby providing a liquid flow space between the sides of the smaller diameter portions of said head and the internal wall of said strainer, said lower tenon of the central plate of said strainer being adjustably fitted in a square cross-sectional portion of the axial bore of said pump.

8. A machine according to claim 3, wherein an anti-turbulence element is disposed in said brew tank surrounding said tubular conduit, said element comprising a tubular member providing a cylindrical chamber between said tubular member and said tubular duct in which the lower portion of said pump is freely disposed for rotation, the wall of the lower end portion of said tubular element being provided with filtering openings, and a disc surrounding said tubular member upon its lower end portion above the bottom thereof, said disc having filtering openings through its surface, and having an upwardly bent edge forming a ring flange movably disposed against the wall of said brew tank.

*9. A machine for making infusions, particularly for brewing coffee, comprising: a brew tank for brewing and storing a batch of the infusion including an upper portion and a lower portion, a centrifugal strainer for holding grounds to be infused located in the upper portion of said brew tank, said centrifugal strainer being accessible directly from the uppermost portion of the brew tank to receive a charge of the infusion, a centrifugal pump having an inlet port in the lower end of the lower portion of said brew tank and extending into the upper portion of said brew tank in open communication with said centrifugal strainer for causing liquid in the lower portion of the brew tank to flow into said centrifugal strainer, means connecting the centrifugal strainer and pump for rotation with respect to a vertical axis, means for rotating said pump and said strainer, means intermediate the pump and the strainer to screen the infusion and retain it in said strainer, said centrifugal pump comprising a generally conical-shaped member having its smaller diameter in the lower portion and the larger upper diameter in the upper portion and including passageways communicating from inlet ports at the lower end to exit ports at the enlarged upper end, said passageways extending longitudinally and outwardly from the inlet ports to the outlet ports so that on rotation of the pump liquid in the lower portion is caused to be pumped into the centrifugal strainer in the upper portion.*

References Cited

The following references, cited by the Examiner, are of record in the patented file of this patent or the original patent.

UNITED STATES PATENTS

| | | | |
|---|---|---|---|
| 1,471,752 | 10/1923 | Rieckmann | 99—302 |
| 1,789,334 | 1/1931 | Englung | 99—302 X |
| 1,436,701 | 11/1922 | Eliel | 210—360 X |
| 2,858,762 | 11/1958 | Wade | 99—287 |
| 3,023,691 | 3/1962 | Turner | 99—287 |

FOREIGN PATENTS

| | | |
|---|---|---|
| 208,788 | 12/1923 | Great Britain. |
| 601,964 | 2/1960 | Italy. |

WILLIAM I. PRICE, *Primary Examiner.*